United States Patent [19]
Dufresne et al.

[11] Patent Number: 5,985,787
[45] Date of Patent: Nov. 16, 1999

[54] CATALYST PRESULPHURATION PROCESS USING TWO DIFFERENT PRESULPHURATION AGENTS

[75] Inventors: Pierre Dufresne, Valence; Nilanjan Brahma, La Voulte sur Rhone, both of France; Stephen R. Murff, Houston, Tex.

[73] Assignee: Europenne De Retraitement De Catalyseurs Eurecat, France

[21] Appl. No.: 08/260,295

[22] Filed: Jun. 14, 1994

[30] Foreign Application Priority Data

Jun. 14, 1993 [FR] France .................................. 93 07230

[51] Int. Cl.⁶ .................. B01J 27/047; B01J 27/051; B01J 23/00
[52] U.S. Cl. .................. 502/220; 502/219; 502/221; 502/222; 502/315; 502/321; 502/325; 502/337
[58] Field of Search ........................ 502/220, 221, 502/222, 219, 337, 315, 321, 325

[56] References Cited

U.S. PATENT DOCUMENTS

| | | | |
|---|---|---|---|
| 4,111,796 | 9/1978 | Yanik et al. | 502/220 |
| 4,431,747 | 2/1984 | Seiver et al. | 502/220 |
| 4,530,917 | 7/1985 | Berrebi | 502/220 |
| 4,719,195 | 1/1988 | Toulhoat et al. | 502/216 |
| 4,725,569 | 2/1988 | Tuszynski et al. | 502/168 |
| 5,041,404 | 8/1991 | Seamans et al. | 502/150 |

FOREIGN PATENT DOCUMENTS

| | | |
|---|---|---|
| 0 506 206 | 9/1992 | European Pat. Off. . |
| 0 517 555 | 12/1992 | European Pat. Off. . |

Primary Examiner—Marian C. Knode
Attorney, Agent, or Firm—Millen, White, Zelano & Branigan, P.C.

[57] ABSTRACT

The invention concerns a novel presulphuration process for a hydrocarbon conversion catalyst. Presulphuration is preferably carried out offsite (ex-situ). The catalyst presulphuration process is characterized in that a presulphuration agent is used which contains (a) at least one first sulphur compound with a decomposition point T1 of less than 220° C. and (b) at least one second sulphur compound with a decomposition point greater than about 220° C.

16 Claims, No Drawings

CATALYST PRESULPHURATION PROCESS USING TWO DIFFERENT PRESULPHURATION AGENTS

BACKGROUND OF THE INVENTION

Presulphuration of hydrocarbon conversion catalysts, primarily for hydrotreatment and hydrodesulphuration and preferably offsite, is carried out in order to fix a sulphur compound on a solid before loading into a catalytic reactor unit. This has been described in our U.S. Pat No. 4,719,195 and European patent EP-A-448 435. During reactor start-up, the sulphur compound decomposes and rapidly and homogeneously sulphurizes the metal oxides present on the catalyst surface to transform them into the sulphide by reaction with the hydrogen present.

The sulphur compound is a polysulphide which is either introduced as a tertiononyl polysulphide by impregnating the catalyst, or a polysulphide is formed on the solid surface by combination of elementary sulphur with an olefinic compound in a vulcanization type reaction (see French patent application 92/04 051).

Reactor start-up generally consists of heating the unit in a hydrogen rich gas. The heating rates are generally between 5 and 50° C./hour.

When the sulphur compound is a polysulphide, sulphur and hydrogen react together in the reactor at temperatures generally between 100 and 200° C., to produce hydrogen sulphide $H_2S$ which then sulphurizes the oxides in the catalysts. The reactions can be written as follows for a catalyst containing nickel and molybdenum metals:

  (1)

  (2)

  (3)

This process operates well and optimally activates the catalysts in the majority of cases. Nevertheless, improvement is necessary in some instances, in particular in two cases which are cited by way of non exhaustive examples. The first concerns catalytic units for the hydrotreatment of crude oil fractions which units are not provided with gas recycling apparatus. In this case, during the activation step in hydrogen with an increasing temperature, a certain amount of $H_2S$ is formed which is not captured by the metals. This quantity is low, an the order of a few per cent of sulphur with respect to the total weight of sulphur introduced. A first means of limiting this loss is to introduce a slightly higher initial amount of sulphur than stoichiometrically necessary. However, the absence of gas recycling apparatus means that the catalyst is constantly supplied with gas which is free of $H_2S$ and at high temperature, for example 250° C., 300° C. or 350° C., well above the decomposition temperature of the sulphur compound. The partial pressure of $H_2S$ in the voids in the catalyst is thus very low. Thus the final stage in the formation of the active phase, namely recrystallization involving atom migration, must be carried out in a non zero partial pressure of $H_2S$.

The second instance where conventional techniques are in need of perfecting is where nickel and tungsten-based catalysts are to be activated. Tungsten has a chemistry which is similar to molybdenum, with slight differences: most importantly in this case, the formation kinetics for the active $NiS.WS_2$ phase are slower than that of the $NiS.MoS_2$ pair. Thus the final temperature of the activation phase for tungsten is ideally 350° C. to 400° C., whereas for molybdenum based catalysts it is typically between 300° C. and 350° C. At this higher temperature, an absence of $H_2S$ can seriously and adversely affect phase formation and thus catalyst activity, because of possible formation of $WO_2$ type species, ie, oxides of quadrivalent tungsten, accompanied by sintering. Nickel and tungsten based catalysts are therefore difficult to activate properly since they are both presulphurized by polysulphide type compounds and the unit is not provided with a gas recycling system.

SUMMARY OF THE INVENTION

The invention relates to the use of other types of sulphur compound whose decomposition temperatures are significantly higher than those of polysulphides in order to generate hydrogen sulphide at temperatures typically of between about 200° C. and 350° C. These novel compounds can be used alone as a sulphurizing agent, but in accordance with the invention they are used with at least one other sulphur compound, preferably mixed with at least one polysulphide. Optimally, a fraction of the sulphur is liberated as hydrogen sulphide at a temperature of about 150° C. and the remainder is produced at about 220° C. (preferably 250° C. to about 300° C.). The partial pressure of $H_2S$ is thus sufficient across the entire temperature range during the activation period.

The invention thus concerns a presulphuration process, preferably offsite, for a hydrocarbon conversion catalyst, wherein presulphuration of the catalyst is carried out using a mixture containing (a) at least one first sulphur compound with a decomposition point T1 less than about 220° C. and (b) at least one second sulphur compound with a decomposition point T2 greater than about 220° C., preferably greater than 250° C. (decomposition measurements normally determined under hydrogen).

The first sulphur compound generally has a —S—C— or —S—S— type structure. Non-limiting examples are organic polysulphides, elemental sulphur, a combination of sulphur and vegetable oil (or a rape seed oil) and sulphur associated with an olefin, ie, the sulphur compounds claimed as sulphurising agents in the patents cited above, namely U.S. Pat. No. 4,719,195, EP-A-448 435 and FR 92/04051.

The second sulphur compound or sulphurizing agent has a structure in which at least one sulphur atom is bonded to at least one oxygen atom. Non-limiting examples are sulphones (alkyl, aryl, alkylaryl and arylalkyl sulphones) or sulphoxides, sulphonic acids and derivatives thereof, sulphates (ammonium, etc . . . ), sulphites (ammonium, etc . . . ), sulpholanes and sulpholane derivatives. Examples of sulphoxides and/or sulphones are dimethyl sulphoxide ($CH_3SOCH_3$), diethyl sulphoxide ($C_2H_5SOC_2H_5$), decyl methyl sulphoxide ($CH_3SOC_{10}H_{21}$), dodecyl methyl sulphoxide ($CH_3SOC_{12}H_{25}$), dodecyl hydroxyethyl sulphoxide ($C_{12}H_{25}SOC_2H_4OH$), dimethyl sulphone ($CH_3SO_2CH_3$) and sulpholane ($C_4H_8SO_2$). Examples of sulphonic acids and their derivatives are methyl sulphonyl chloride ($CH_3SO_2Cl$), methane sulphonic acid ($CH_3SO_3H$), methane sulphonamide ($CH_3SO_2NH_2$), ethyl sulphonyl chloride ($C_2H_5SO_2Cl$) and ethane sulphonic acid.

The weight ratio between the amount of sulphur produced from the first sulphur compound and that from the second sulphur compound is between 100 and 0.5, preferably between 50 and 1.

The invention further concerns the use of catalysts which have been presulphurized using the above techniques, in conversion reactions in particular hydrocarbon hydroconversion reactions and most particularly hydrodesulphurisation and hydrotreatment reactions. These are carried out, for example, in the presence of catalysts based on at least one metal or metal compound selected from the group constituted by molybdenum, chromium, tungsten, cobalt, nickel, and most particularly nickel-molybdenum and nickel-tungsten pairs. The catalyst is used in a hydrogen atmosphere.

The following examples illustrate the invention.

EXAMPLE 1 (COMPARATIVE)

Use of ditertiononyl polysulphide as presulphuration agent 150 grams of a hydrodesulphuration catalyst containing 5% of Co) and 20% of $MoO_3$ by weight on an alumina support was presulphurised using a presulphuration solution containing 45% by volume of TPS 37 (organic polysulphide termed ditertiononyl polysulphide, sold by ELF ATOCEHM) and 55% by volume of white spirit, a heavy petroleum spirit with respective initial and final boiling points of 150° C. and 250° C. This solution was used to impregnate the catalyst pores. The temperature of the impregnated solid was then raised to 140° C. at a pressure of 10 Torr (1333 Pa, ie 13.33×10$^{-3}$ bars) for two hours, whereby, the solvent was evaporated off. The product obtained contained 6.7% by weight of sulphur and 4.9% of carbon. This catalyst, catalyst A, was characterised using DSC (Differential Scanning Calorimetry). The catalytic activity was determined in an activity test. Table 1 shows the results and operating conditions.

EXAMPLE 2 (COMPARATIVE)

Use of elementary sulphur and vegetable oil as presulphuration agents.

150 grams of the catalyst of Example 1 was impregnated with a solution containing 13 grams of powdered elemental sulphur and 39 grams of linseed oil (unsaturated vegetable oil) in suspension or dissolved in 65 ml of white spirit as in Example 1. This solution was used to impregnate the pores of the catalyst. The temperature of the impregnated solid was brought to 140° C. at a pressure of 10 Torr (1333 Pa, ie 13.33×10$^{-3}$ bars) for two hours whereby the solvent was evaporated off. The final product contained 6.8% by weight of sulphur and 7.4% by weight of carbon. This catalyst, catalyst B, was characterised using DSC. Results of catalytic activity tests and operating conditions are shown in Table 1.

EXAMPLE 3 (COMPARATIVE)

Dimethylsulphone alone as presulphuration agent.

The method of Examples 1 and 2 was repeated, this time impregnating 150 g of catalyst with 40 grams of dimethylsulphone ($C_2H_6SO_2$, ie, an organic sulphoxide containing 33.4% by weight of sulphur) dissolved in 65 ml of white spirit as above. The final product contained 6.5% by weight of sulphur and 8.2% by weight of carbon. This catalyst, catalyst C, was also characterised using DSC and its catalytic activity was determined in a test whose operating conditions and results are shown in Table 1.

EXAMPLE 4 (ACCORDING TO THE INVENTION)

Presulphuration using a mixture of TPS and dimethylsulphone.

150 grams of catalyst as used in Examples 1 to 3 was impregnated using a solution containing 20 grams of a first presulphuration agent, TPS 37, and 20 grams of a second presulphuration agent, dimethylsulphone. The mixture of the two presulphuration agents was dissolved in white spirit. Impregnation of the catalyst pores was carried out as in the previous Examples. The solvent was then evaporated off by raising the temperature of the catalyst to 140° C. for two hours at 10 Torr (1333 Pa, ie, 13.33×10$^{-3}$ bars). The catalyst produced, catalyst D, contained 6.8% by weight of sulphur and 6.6% by weight of carbon. It was characterised using DSC and its catalytic activity was determined in a test whose operating conditions and results are shown in Table 1.

EXAMPLE 5 (ACCORDING TO THE INVENTION)

The previous Example was repeated using 75 grams of TPS 37 instead of the 20 grams used in Example 4 and 4 grams of dimethylsulphone instead of the 20 grams used in Example 4. The catalyst produced, catalyst E, contained 7.3% by weight of sulphur and 7.2% by weight of carbon. The results of the tests using catalyst E are also shown in Table 1.

EXAMPLE 6 (ACCORDING TO THE INVENTION)

Presulphuration was carried out using a mixture of linseed oil, elemental sulphur and dimethylsulphone. 150 grams of the catalyst used in the preceding Examples was impregnated using a solution containing a first presulphuration agent consisting of a mixture of 12 grams of powdered elemental sulphur and 36 grams of linseed oil and a second presulphuration agent consisting of 4 grams of dimethylsulphone. The presulphuration agents were dissolved in 65 ml of white spirit. Following impregnation of the catalyst pores, the solvent was evaporated off as in the previous Examples by bringing the catalyst to a temperature of 140° C. for two hours at a pressure of 10 Torr (1333 Pa). The final catalyst, catalyst F, contained 7.3% by weight of sulphur and 7.2% by weight of carbon. Its activity was tested as for catalysts A to E; the results are shown in Table 1.

The symbol x in Table 1 indicates for each catalyst whether at least one presulphuration agent has been used which has a decomposition temperature T1 of less than 220° C.

The symbol y in the Table indicates whether at least one presulphuration agent has been employed which has a decomposition temperature T2 of greater than 220° C. The process of the invention requires a mixture of at least one agent with a decomposition temperature of less than 220° C. (symbol x) and at least one agent with a decomposition temperature greater than 220° C. (symbol y). Catalysts D, E and F are thus in accordance with the invention since the two types of agent are simultaneously present to presulphurise the catalyst.

The experimental conditions for the DSC in order to determine the decomposition temperature of each sulphurising agent were as follows:

Apparatus: Setaram C 80

Rate of heating: 0.5° C. per minute

Hydrogen pressure: 30 bars

Toluene hydrogenation was used as the activity test for catalysts A to F. The feed contained 2% by volume of thiophene, 20% by volume of toluene and 78% by volume of cyclohexane. The operating pressure was 60 bars with a LHSV (liquid hourly space velocity) of 2 volumes of feed per volume of catalyst per hour. The operating temperature was 350° C.

TABLE 1

| Catalyst | DSC T1 < 220° C. | DSC T2 > 220° C. | Hydrogenation of toluene Relative vol activity |
|---|---|---|---|
| A | x |   | 100 |
| B | x |   | 100 |
| C |   | y | 95 |
| D | x | y | 115 |
| E | x | y | 120 |
| F | x | y | 125 |

Catalysts D, E and F produced the best test results. Incorporation into the catalyst of a sulphuration agent with a high decomposition point prolonged the activity of the catalyst employed, providing that a conventional presulphuration agent (TPS or elemental sulphur or linseed oil) was also used. The use of a high decomposition point agent alone (catalyst C) did not produce the anticipated improvement.

We claim:

1. In a process for presulphurizing a hydrocarbon conversion catalyst, the improvement comprising employing a presulphuration agent containing (a) at least one first sulphur compound having a decomposition point T1 of less than 220° C. and (b) at least one second sulphur compound having a decomposition point T2 greater than about 220° C.

2. A process according to claim 1 wherein said first sulphur compound contains at least one —S—S— or —S—C— structure.

3. A process according to claim 1 wherein said second sulphur compound has a structure comprising at least one sulphur atom bonded to at least one oxygen atom.

4. A process according to claim 1 wherein said first sulphur compound contains at least one —S—S— or —S—C— structure and said second sulphur compound has a structure comprising at least one sulphur atom bonded to at least one oxygen atom.

5. A process according to claim 4, wherein said first sulphur compound is selected from the group consisting of (a) organic polysulphides, (b) elemental sulphur, (c) a combination of sulphur and vegetable oil or a material resulting from a vegetable oil and (d) a combination of sulphur and an olefin, and wherein said second sulphur compound is selected from the group consisting of (a) sulphones, (b) sulphoxides, (c) sulphonic acids, (d) sulphates, (e) sulphites, (f) sulpholanes and derivatives of (c)–(f).

6. A process according to claim 5 wherein the catalyst contains at least one metal selected from the group consisting of molybdenum, nickel, cobalt and tungsten.

7. A process according to claim 1, wherein the first sulphur compound and the second sulphur compound produce amounts of sulphur and the weight ratio between the amount of sulphur produced from the first sulphur compound and that from the second sulphur compound is between 100:1 and 0.5:1.

8. A process according to claim 1 as applied to offsite presulphuration of a catalyst.

9. A process according to claim 1 wherein the second sulphur compound is dimethylsulphone or sulpholane.

10. A process according to claim 1 wherein the catalyst comprises a cobalt-molybdenum, nickel-molybdenum or nickel-tungsten pair.

11. In catalytic hydrodesulphurization or hydrotreatment reactions in a hydrogen atmosphere, the improvement comprising employing as the catalyst a presulphurized catalyst according to claim 1.

12. A process according to claim 7, wherein the weight ratio is between 50:1 and 1:1.

13. A process according to claim 11, wherein hydrotreatment is conducted of crude oil fractions in units not provided with gas recycling apparatus.

14. A process according to claim 1, wherein the catalyst comprises a nickel and tungsten based catalyst.

15. A process according to claim 13, wherein the catalyst comprises a nickel and tungsten based catalyst.

16. A process according to claim 1, wherein the decomposition temperature of the second sulphur compound is greater than 250° C.

* * * * *